United States Patent
Chen et al.

(10) Patent No.: US 7,382,512 B2
(45) Date of Patent: Jun. 3, 2008

(54) RESISTIVITY PHASE CHANGE MATERIAL

(76) Inventors: Zhizhang Chen, 1000 NE. Circle Blvd., Corvallis, OR (US) 97330-4239; Qin Liu, 1000 NE. Circle Blvd., Corvallis, OR (US) 97330-4239; Timothy F. Myers, 1000 NE. Circle Blvd., Corvallis, OR (US) 97330-4239; Chien-Hua Chen, 1000 NE. Circle Blvd., Corvallis, OR (US) 97330-4239

(*) Notice: Subject to any disclaimer, the term of this patent is extended or adjusted under 35 U.S.C. 154(b) by 240 days.

(21) Appl. No.: 11/259,609

(22) Filed: Oct. 26, 2005

(65) Prior Publication Data
US 2007/0089492 A1   Apr. 26, 2007

(51) Int. Cl.
*G02F 1/01* (2006.01)
*G02F 1/03* (2006.01)
*G02F 1/1333* (2006.01)
*G02F 1/1335* (2006.01)

(52) U.S. Cl. ............ 359/279; 359/245; 359/246; 359/254; 349/17; 349/86; 349/106; 349/200; 365/111; 313/463; 372/50.1

(58) Field of Classification Search ............ None
See application file for complete search history.

(56) References Cited

U.S. PATENT DOCUMENTS

| | | | | |
|---|---|---|---|---|
| 3,550,095 A * | 12/1970 | Kohashi | ............ | 365/111 |
| 3,631,411 A | 12/1971 | Kosonocky et al. | | |
| 4,277,145 A | 7/1981 | Hareng et al. | | |
| 4,286,842 A | 9/1981 | Borner | | |
| 4,426,704 A * | 1/1984 | Nagai et al. | ............ | 372/50.1 |
| 4,622,654 A | 11/1986 | Yaniv et al. | | |
| 4,828,368 A * | 5/1989 | Efron et al. | ............ | 359/263 |
| 4,846,559 A | 7/1989 | Kniffler | | |
| 5,073,010 A | 12/1991 | Johnson et al. | | |
| 5,155,609 A * | 10/1992 | Konno et al. | ............ | 349/30 |
| 5,194,972 A * | 3/1993 | Lim et al. | ............ | 349/1 |
| 5,321,536 A * | 6/1994 | Ishii et al. | ............ | 349/17 |
| 5,444,558 A * | 8/1995 | Imanishi et al. | ............ | 349/116 |
| 5,612,798 A | 3/1997 | Tuli | | |
| 6,118,259 A | 9/2000 | Bucks | | |
| 6,359,674 B1 * | 3/2002 | Horiuchi | ............ | 349/200 |
| 6,560,001 B1 * | 5/2003 | Igasaki et al. | ............ | 359/245 |
| 6,798,472 B2 * | 9/2004 | Nagae | ............ | 349/106 |
| 6,831,856 B2 | 12/2004 | Pashmokov | | |
| 6,870,583 B2 | 3/2005 | Okada et al. | | |
| 6,987,598 B2 * | 1/2006 | Wada et al. | ............ | 359/254 |
| 7,170,664 B2 * | 1/2007 | Wada et al. | ............ | 359/254 |
| 2003/0011868 A1 | 1/2003 | Zehner et al. | | |
| 2005/0030784 A1 | 2/2005 | Johnson | | |

FOREIGN PATENT DOCUMENTS

JP  01-116527 A  5/1989
WO  WO 2005/096380 A  10/2005

OTHER PUBLICATIONS

Nawrocki, M. Shaw, et al., "Improving the Process Capability of SU-8," (Undated), 7 pgs., MicroChem Corp., Newton, MA 02464.
Johnson, D.W., et al., "Improving the Process Capability of SU-8, Part II," (Undated), 7 pgs., MicroChem Corp., 1254 Chestnut Street, Newton, MA 02464, undated.

* cited by examiner

*Primary Examiner*—Loha Ben

(57) ABSTRACT

Various devices and methods employing a resistive phase change material are disclosed.

28 Claims, 3 Drawing Sheets

RESISTIVITY PHASE CHANGE MATERIAL

BACKGROUND

Thin film transistors are sometimes used to modulate voltage to selectively attenuate light in displays. As a result, such displays may be complex and expensive, may utilize high voltages and may lack image quality and resolution.

DETAILED DESCRIPTION OF THE EXAMPLE EMBODIMENTS

Figure 1:
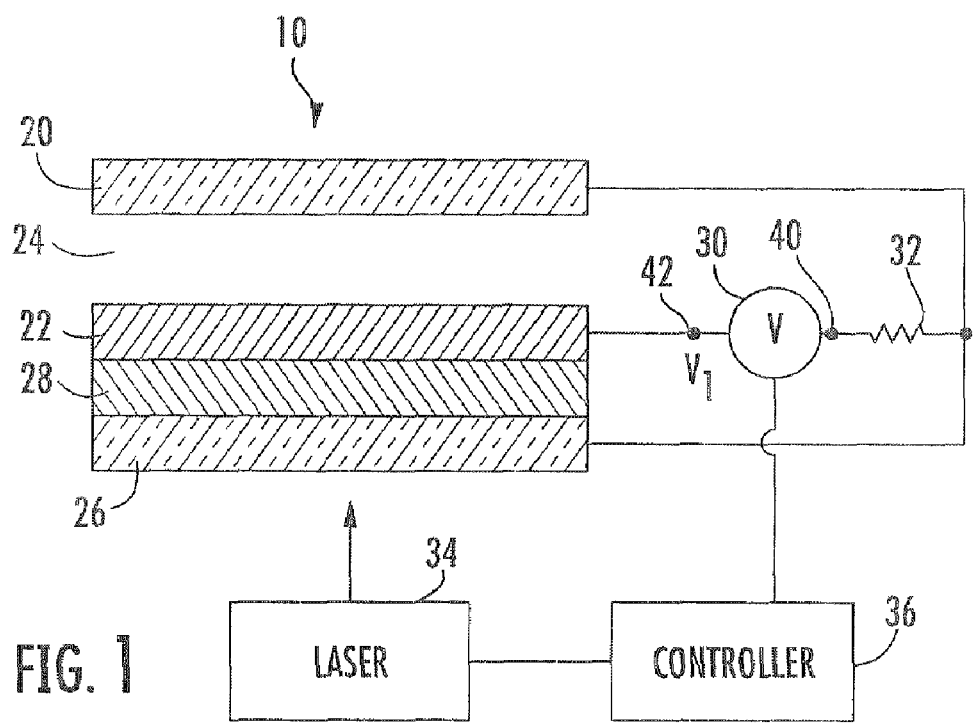
FIG. 1 is a schematic illustration of one example of a voltage modulator according to an example embodiment.

FIG. 1 schematically illustrates one example of a voltage modulator 10 that may be used to selectively apply a voltage or electrical field across a structure or a gap which may or may not be filled. As will be described in greater detail hereafter with respect to FIGS. 4-6, modulator 10 is well suited for use in displays. In other embodiments, modulator 10 may be utilized in other applications.

As shown by FIG. 1, voltage modulator 10 generally includes electrode 20, electrode 22, gap 24, electrode 26, phase change layer 28, voltage source 30, resistor 32, laser 34 and controller 36. Electrode 20 constitutes a structure or layer of electrically conductive material proximate to gap 24. Electrode 20 is electrically connected to terminal 40 of voltage source 30 and is further electrically connected to electrode 26. Electrode 20 cooperates with electrode 22 to establish an electric field across gap 24. In one embodiment, electrode 20 is substantially transparent so as to transmit light. In one embodiment, electrode 20 is formed from an electrically conductive transparent material such as indium tin oxide. In other embodiments, electrode 20 may be formed from other transparent electrically conductive materials such as PEDOT or other transparent, partially transparent, partially reflective or opaque electrically conductive materials.

Electrode 22 constitutes a structure or layer of electrically conductive material proximate to gap 24 on an opposite side of gap 24 as electrode 20. Electrode 22 is electrically connected to terminal 42 of voltage source 30. Electrode 22 cooperates with electrode 20 to form an electric field across gap 24. In one embodiment, electrode 22 is formed from an electrically conductive opaque or light blocking material such as copper, gold or aluminum. In one embodiment, electrode 22 is configured to reflect light. In still other embodiments, electrode 22 may be formed from other light reflective or light transmissive electrically conductive materials.

Electrode 26 constitutes one or more layers of electrically conductive material proximate to phase change layer 28 on an opposite side of phase change layer 28 as electrode 22. Electrode 26 is electrically connected to terminal 40 of voltage source 30 and to electrode 20. As a result, electrode 26 is at substantially the same potential as electrode 20. In one embodiment, electrode 26 constitutes one or more layers of transparent electrically conductive material such that energy from laser 34 may be transmitted through electrode 26 to phase change layer 28. In one embodiment, electrode 26 may be formed from a transparent electrically conductive material such as indium tin oxide or PEDOT. In other embodiments, electrode 26 may include other electrically conductive transparent materials. In still other embodiments where energy is applied to phase change layer 28 in other manners, electrode 26 may be formed from opaque electrically conductive materials. Electrode 26 may also be formed of a metal layer with openings to be partially transparent and allow energy to reach phase change layer 28.

Phase change layer 28 constitutes one or more layers of one or more materials configured to change between different phases or states having distinct levels of electrical resistance. Once in a particular state, the material or materials of layer 28 are further configured to substantially maintain the same level of resistance in absence of further applied energy or until subsequent application of energy to the material or materials. Phase change layer 28 is electrically coupled between electrode 22 and electrode 26. When in a high resistance state, layer 28 may substantially insulate electrode 22 from electrode 26. When in a low resistance state, layer 28 may freely conduct current between electrode 22 and electrode 26. In one embodiment, phase change layer 28 includes Group 4 semiconductors (i.e., semiconductors formed from materials in Group 4 of the Periodic Table). For example, phase change layer 28 may be formed from crystalline silicon, polycrystalline or amorphous silicon. In other embodiments, phase change layer 28 may include other phase change materials such as II-V and III-VI compound semiconductors.

Voltage source 30 constitutes a source of alternating current having terminals 40 and 42. As noted above, terminal 40 facilitates electrical connection of voltage source 30 to electrodes 20 and 26. Terminal 42 facilitates electrical connection of voltage source 30 to electrode 22. In other embodiments, source 30 may supply a direct current.

Resistor 32 is electrically connected between voltage source 30 and electrodes 20 and 26. Resistor 32 is used as a voltage divider.

Laser 34 constitutes a device configured to apply energy to phase change layer 28 in sufficient quantities or for sufficient durations so as to change one or more materials of layer 28 between the different states and levels of resistance. In one embodiment, laser 34 constitutes a laser configured to direct one or more beams of laser light through electrode 26 to phase change layer 28. Although not shown, in embodiments where energy source 34 constitutes one or more lasers, energy source 34 may additionally include one or more actuators and one or more optical lenses, masks and the like for directing energy to layer 28. In one embodiment, laser 34 constitutes a laser configured to impinge a spot or point having a diameter generally facing gap 24 and being less than or equal to about 0.5 microns in size. In one embodiment, laser 34 may comprise a solid state blue laser of 421 nm wavelength laser.

Controller 36 constitutes a processing unit configured to generate control signals for directing voltage source 30 and for further directing laser 34. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 36 is not limited to any specific combination of hardware circuitry and software, nor to any particular source for the instructions executed by the processing unit.

Controller 36 varies the resistivity of phase change layer 28 by selectively applying energy to phase change layer 28 to change layer 28 between different resistance states. In one embodiment, controller 36 selectively applies energy to phase change layer 28 using laser 34. In one embodiment, controller 36 generates control signals such that laser 34 passes a laser through electrode 26 to irradiate phase change layer 28. Controller 36 generates control signals such that laser 34 selectively applies laser pulses having different intensities and/or for different durations to change layer 28 between different resistance states. Once one or more portions of phase change layer 28 have been changed to a desired resistance state, application of energy to the one or more portions of layer 28 is ceased. Those portions of phase change layer 28 substantially maintain their states of resistance without further application of energy from laser 34 and until such portions are once again irradiated with energy from laser 34.

In operation, controller 36 generates control signals causing laser 34 to apply energy to phase change layer 28 so as to selectively change layer 28 between different resistance states. By changing phase change layer 28 between different resistance states, controller 36 further controls the electrical field applied across gap 24.

Figure 2:
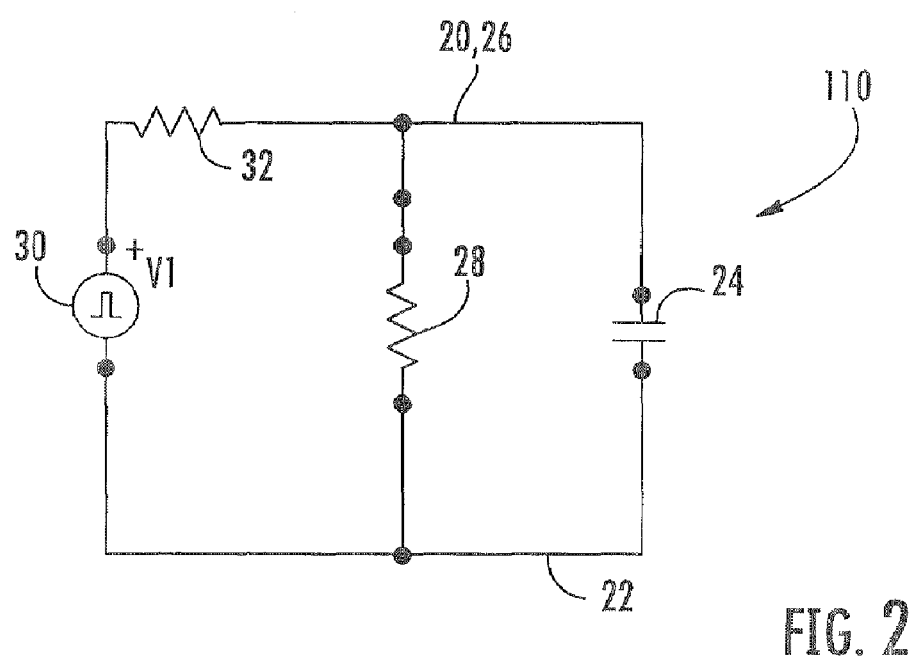
FIG. 2 is a circuit diagram illustrating an electrical circuit corresponding to the voltage modulator of FIG. 1 according to an example embodiment.

FIG. 2 schematically illustrates an electrical circuit 110 which corresponds to modulator 10 in FIG. 1. For purposes of discussion, those components of circuit diagram 110 which correspond to modulator 10 in FIG. 1 are numbered similarly. As shown by the circuit diagram of FIG. 2, gap 24 and any suitable materials located within gap 24 act as a capacitor between electrodes 20 and 22. Phase change layer 28 acts as a resistor between electrodes 20, 26 and 22. Because phase change layer 28 and gap 24 are electrically connected in parallel between electrode 22 and electrodes 20, 26, the charge or electrical field across gap 24 varies as a result of the resistance provided by phase change layer 28. As the resistance of phase change layer 28 increases, the voltage or electrical field across gap 24 also increases. Likewise, as the resistance provided by phase change layer 28 decreases, the voltage or electrical field across gap 24 also decreases. Thus, by controlling and selectively varying the resistance of phase change layer 28, controller 36 also varies and controls the voltage across gap 24.

Because phase change layer 28 substantially maintains its level of resistance without further application of energy from laser 34 and until being subsequently irradiated with energy from laser 34, a desired electrical voltage across those corresponding portions of gap 24 may also be substantially maintained without further substantial refreshment. Moreover, because controller 36 (shown in FIG. 1) applies energy to layer 28 using laser 34, finite and continuous portions of layer 28 may be selectively irradiated, enabling the finite portions of layer 28 to be provided with distinct resistance states. As a result, finite portions of gap 24 may also be provided with distinct electrical fields, facilitating greater resolution between portions of gap 24 that have distinct electric fields across them. In embodiments where voltage modulator 10 is employed in a display, such an enhanced resolution may also lead to enhanced image resolution.

Figure 3A:
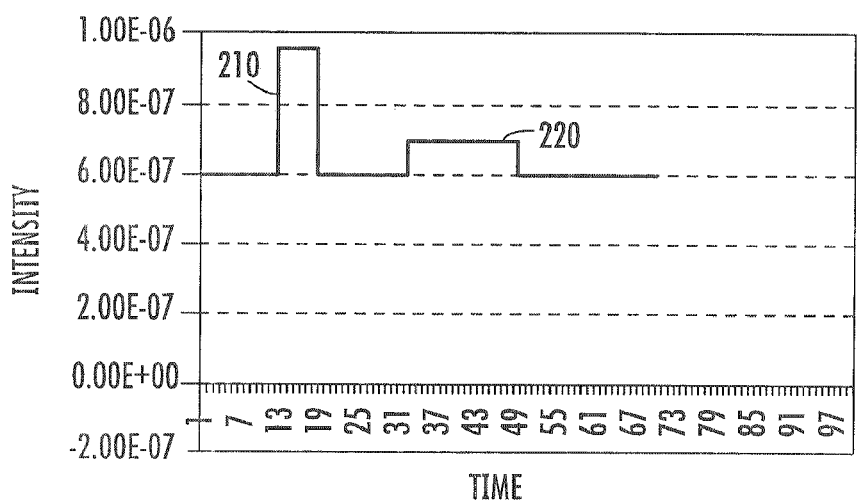
FIG. 3A is a graph illustrating laser pulses that may be employed in the voltage modulator of FIG. 1 according to an example embodiment.
Figure 3B:
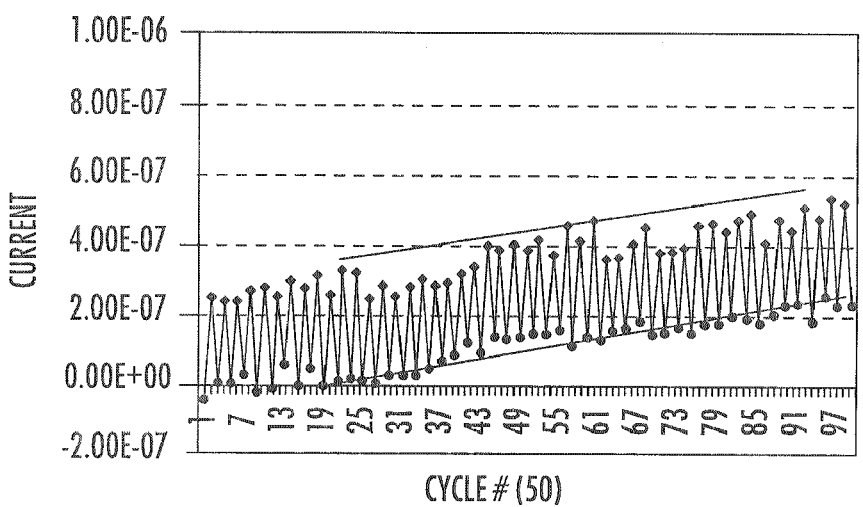
FIG. 3B is a graph illustrating electrical current across a resistive phase change material as a function of the application of the laser pulses of FIG. 3A according to an example embodiment.

FIGS. 3A and 3B are graphs illustrating one example method for changing a portion of layer 28 between different resistance states. In particular, as shown by FIG. 3A, controller 36 (shown in FIG. 1) generates control signals directing laser 34 to irradiate layer 28 (shown in FIG. 1) with either laser pulse 210 or with laser pulse 220. Laser pulse 210 has a generally higher intensity and shorter duration as compared to the intensity and duration of pulse 220. In one particular embodiment, pulse 210 has a sufficiently large intensity and short duration such that the one or more phase change materials within layer 28 alter the materials of layer 28 to increase their electrical resistance. Likewise, pulse 220 has a lower intensity and a longer duration such that the one or more phase change materials of layer 28 may be restored or annealed so as to have a lower electrical resistance.

In one embodiment in which phase change layer 28 (shown in FIG. 1) is formed from crystalline silicon, pulse 210 has an amplitude of about 8 milliwatts for a duration of about 50 nanoseconds. Pulse 220 has a power amplitude of about 2 milliwatts for a duration of about 1 millisecond. In other embodiments, depending on the particular material or materials of layer 28 as well as the particular characteristics of layer 34, pulses 210 and 220 may have differing power and duration characteristics. Although FIG. 3A illustrates selective application of one of two pulses 210 and 220 to layer 28 to adjust a resistance of portions of layer 28, in other embodiments, controller 36 may generate control signals directing laser 34 to irradiate layer 28 with greater than two distinct pulses having different levels of power or different durations to provide portions of layer 28 with greater than two selected electrical resistances.

FIG. 3B graphically illustrates changing of a portion of layer 28 between two electrical resistance states as a result of the portion being alternately radiated with pulses 210 and 220 shown in FIG. 3A. In particular, FIG. 3B illustrates electrical current conducted across layer 28 after the portion of layer 28 has been irradiated with either pulse 210 or pulse 220. As shown by FIG. 3B, in the particular embodiment in which layer 28 is formed from crystalline silicon, the electrical current conducted by layer 28 greatly differs depending upon whether layer 28 is in the first greater resistance state (graphically represented by the circles) after being irradiated with pulse 210 or is in a second lesser resistance state (graphically represented by the diamonds) after being irradiated by pulse 220. As shown by FIG. 3B, over time, layer 28 may heat up in response to being irradiated multiple times by laser 34 which may result in an overall slight decrease in resistivity unless sufficient cooling is provided. However, the magnitude of the difference between the first lesser resistance state and the second greater resistance state is sufficiently large such that the level of resistance of layer 28 in the first resistance state after approximately one cycle is still substantially less than the level of resistance of layer 28 in the second greater resistance state after approximately 50 cycles. As a result, the likelihood of a portion of layer 28 inadvertently attaining the first lesser resistance state due to heating of layer 28 over time is reduced.

According to one example embodiment, the phase change materials of layer 28 are chosen such that portions of layer 28 may be changed between different resistance states by being irradiated with a laser for a duration of less than or equal to about 2 milliseconds and with a power level of less than or equal to about 10 milliwatts. As a result, modulator 10 may modulate voltage at a high frequency with less power consumption. In one particular embodiment, the phase change material or materials of layer 28 are chosen such that the phase change material has a substantially unchanging resistivity in the absence of applied energy. In one embodiment, the material or materials of layer 28 are configured to have a greater resistance state at least two orders of magnitude times that of a lower resistance state. For example, in the particular embodiment shown in FIG. 3B, layer 28 has a high resistance state of about 100 to 1,000 times that of the resistance of the low resistance state. In one embodiment, layer 28 is formed from crystalline silicon. In other embodiments, layer 28 may be formed from other phase change materials configured to change between different resistance states upon being irradiated by a laser or other energy having different powers and for different durations.

Figure 4:
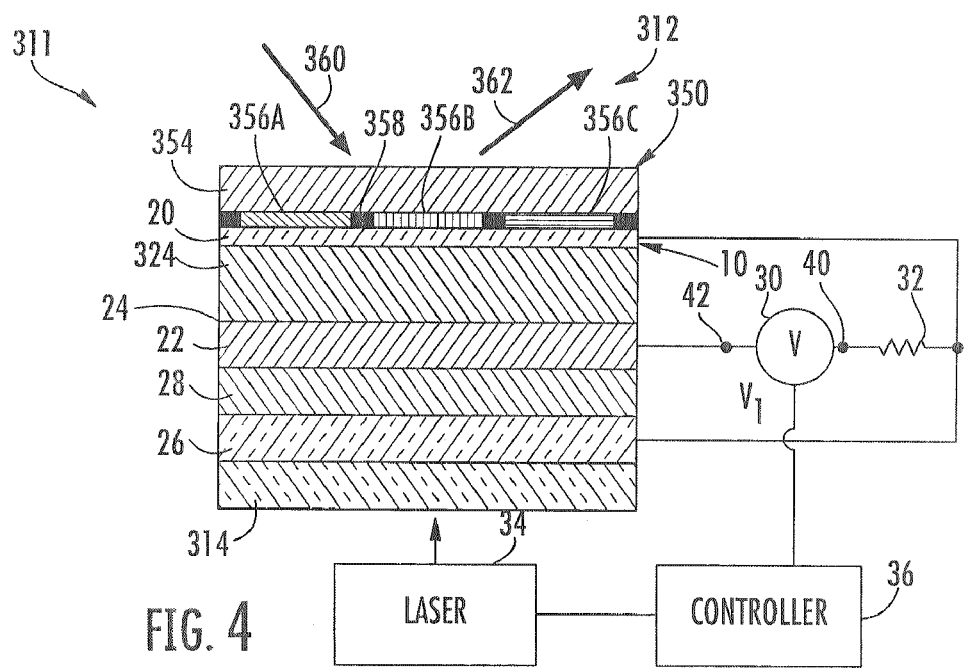
FIG. 4 is a sectional view of a pixel of a display according to an example embodiment.

FIG. 4 schematically illustrates display 312 which includes voltage modulator 10. Display 312 is configured to provide a colored image by differently reflecting light across a 2-dimensional array of pixels, one of which is shown in FIG. 4. In addition to voltage modulator 10, display 312 includes substrate 314, charge responsive optical layer 324 and color filter 350. Substrate 314 constitutes a layer of transparent material supporting electrode 26. In one embodiment, substrate 314 may constitute glass. In other embodiments, substrate 314 may constitute other materials sufficiently transparent to permit passage of energy from laser 34 to layer 28. In still other embodiments, substrate 314 may be omitted.

Charge responsive optical layer 324 is located within gap 24 between electrodes 20 and 22. Charge responsive optical layer 324, sometimes referred to as an active layer, constitutes one or more layers of charge responsive optical material configured to differently attenuate light based at least in part upon an electrical field or voltage created across the material of layer 324 by electrodes 20 and 22. For purposes of this disclosure, the term "light" shall include ultraviolet light, visible light and infra-red light. In one embodiment, the material of layer 324 may constitute a polymer dispersed liquid crystal (PDLC). In other embodiments, the material of layer 324 may constitute other forms of liquid crystal materials, wherein display 312 may or may not additionally include one or more polarizers depending upon the type of liquid crystal materials utilized. In one embodiment, the PDLC may be configured to selectively attenuate visible light. In another embodiment, the PDLC material of layer 324 may alternatively be configured to selectively attenuate ultraviolet light. In one embodiment, the PDLC of layer 324 may be dyed or otherwise colored. In still other embodiments, the PDLC of layer 324 may be substantially white in absence of an electric field.

Color filter 350 filters light that is passed through layer 324 and through electrode 20. Color filter 350 generally includes substrate 354, filter elements 356A, 356B, 356C (collectively referred to as filter elements 356) and light blocking portions 358. Substrate 354 constitutes a layer of transparent material overlying filter elements 356 and light blocking portions 358. In one embodiment, layer 354 may serve as a substrate upon which one or both of filter elements 356 and light blocking portion 358 are formed prior to filter 350 being positioned with respect to voltage modulator 10. In one embodiment, layer 354 may constitute glass. In other embodiments, layer 354 may be formed from other transparent materials, coatings and the like or may be omitted.

Filter elements 356 are configured to filter selected wavelengths of light. In the particular example illustrated, filter element 356A constitutes a green filter, significantly attenuating wavelengths of light other than green wavelengths of light without substantially attenuating green wavelengths of light. Filter element 356B constitutes a red filter, significantly attenuating wavelengths of light other than red wavelengths of light without substantially attenuating wavelengths of light in the red portion of the visible spectrum. Filter element 356C constitutes a blue filter, significantly attenuating wavelengths of light other than blue wavelengths of light without substantially attenuating those wavelengths in the blue portion of the visible spectrum. Because color filter 350 has elements 356 configured to allow each of the colors of red, green and blue to pass, the individual pixel 311 shown in FIG. 4 may reflect red light, green light, blue light or mixtures thereof depending upon the attenuation of light by layer 324. In other embodiments, filter elements 356 may have other colors or may filter fewer colors.

Light blocking portions 358 constitute one or more materials disposed between filter elements 356 that are configured to substantially block all wavelengths of light. In one embodiment, light blocking portions 358 may constitute a layer of dark or black colored material. Light blocking portions 358 inhibit light reflected through one of filter elements 356 from undesirably passing through an adjacent filter element. In other words, light blocking portions 358 reduce optical cross talk between such elements. In other embodiments, light blocking portions 358 may be omitted.

In operation, controller 36 of voltage modulator 10 generates control signals directing laser 34 to selectively impinge or irradiate phase change layer 28 with laser pulses, such as laser pulses 210 and 220 shown in FIG. 3A, so as to selectively change portions of layer 28 between high resistance and low resistance states, depending upon the desired color of light to be reflected from the particular pixel 311. For example, if the particular pixel 311 is to reflect red light, controller 36 generates control signals causing laser 34 to change those portions of layer 28 opposite to filter element 356B to a high resistance state and the remaining portions of layer 28 in pixel 311 to a low resistance state, causing the greater voltage to be formed between electrodes 20 and 22 across layer 324 opposite to filter element 356B. As a result, those portions of layer 324 opposite to filter element 356B have a greater transmissivity such that less light opposite to filter element 356B is attenuated as compared to those portions of layer 324 opposite to filter elements 356A and 356C. Because less light is attenuated in those portions of layer 324 opposite to filter element 356B, the incident light (schematically represented by arrow 360) passes through layer 354, filter element 356B, electrode 20, layer 324 before being reflected off of electrode 22 and once again passing through layer 324, electrode 20, filter element 356B and layer 354 where it is emitted as red light (schematically illustrated with arrow 362). Incident light 360 passing through filter elements 356A and 356C passes through electrode 20 and is attenuated by layer 324. In a similar fashion, other portions of layer 28 may be selectively changed between high and low resistance states to cause layer 324 to selectively attenuate light passing through filter elements 356A, 356B and 356C such that pixel 311 also reflects green light, blue light or mixtures of two or more of green light, red light and blue light.

Figure 5:
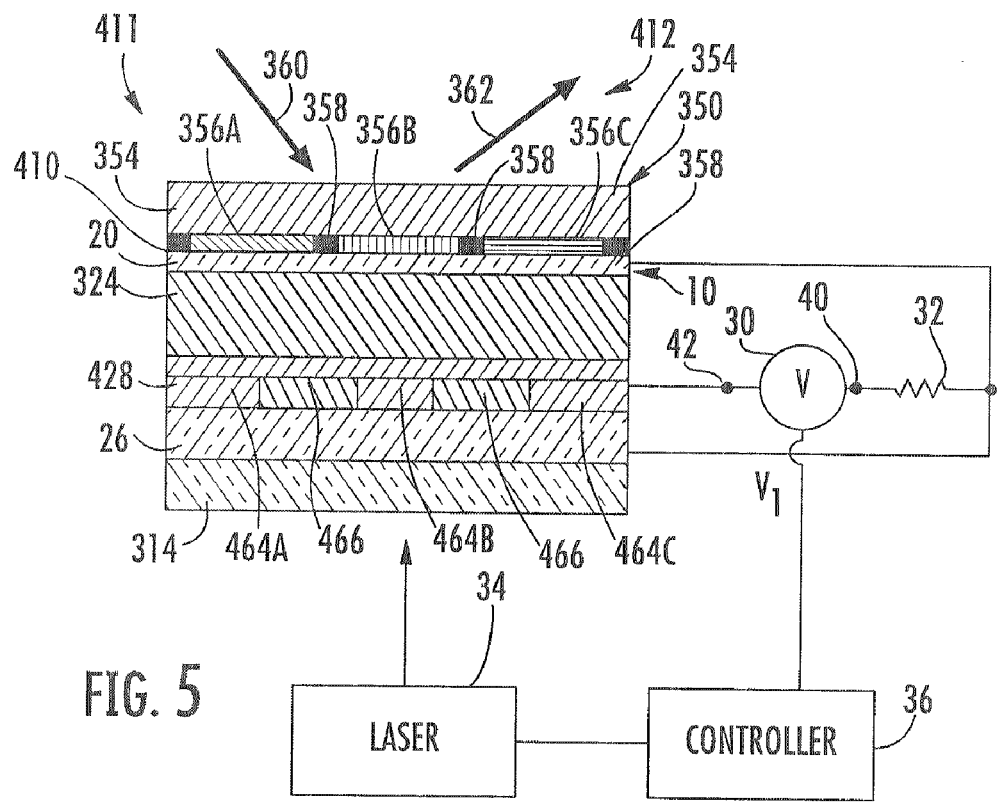
FIG. 5 is a sectional view of another embodiment of the pixel of the display of FIG. 4 according to an example embodiment.

FIG. 5 is a sectional view of an individual pixel 411 of display 412, another embodiment of pixel 311 of display 312. Display 412 is similar to display 312 except that display 412 includes voltage modulator 410 in lieu of voltage modulator 10. Voltage modulator 410 is similar to voltage modulator 10 except that voltage modulator 410 includes phase change layer 428 in lieu of phase change layer 28. Phase change layer 428 is similar to phase change layer 28 except that phase change layer 428 includes phase change portions 464A, 464B and 464C (collectively referred to as portions 464) and spacers 466. Those remaining elements of display 412 which correspond to elements of display 312 are numbered similarly.

Portions 464A, 464B and 464C are formed from substantially the same materials as layer 28 (shown in FIG. 1). Portions 464A, 464B and 464C extend opposite to filter elements 356A, 356B and 356C, respectively. Portions 464 are separated from one another by spacers 466. Spacers 466 constitute one or more layers of one or more dielectric materials. Spacers 466 may enhance resolution of the pattern of portions of layer 428 having either high resistance states or low resistance states. In other words, spacers 466 provide defined boundaries for portions 464 that may be irradiated by laser 34 so as to have distinct resistances. As a result, greater control over transmission of light through filter elements 356 may result.

In operation, display 412 performs similar to that of display 312. In particular, incident light 360 passes through layer 354 and through each of filter elements 356, through electrode 20 and through electrode layer 20. Depending upon which of portions 464A, 464B and 464C of layer 428 are in high resistance states, such incident light 360 further passes through layer 324 and is reflected off of electrode 20. Such reflected light once again passes through portions of layer 324 opposite to those portions of layer 428. having a high resistivity state, passes through electrode 20 and passes through color filter 350 where it is emitted as light 362 having a predetermined wavelength.

Figure 6:
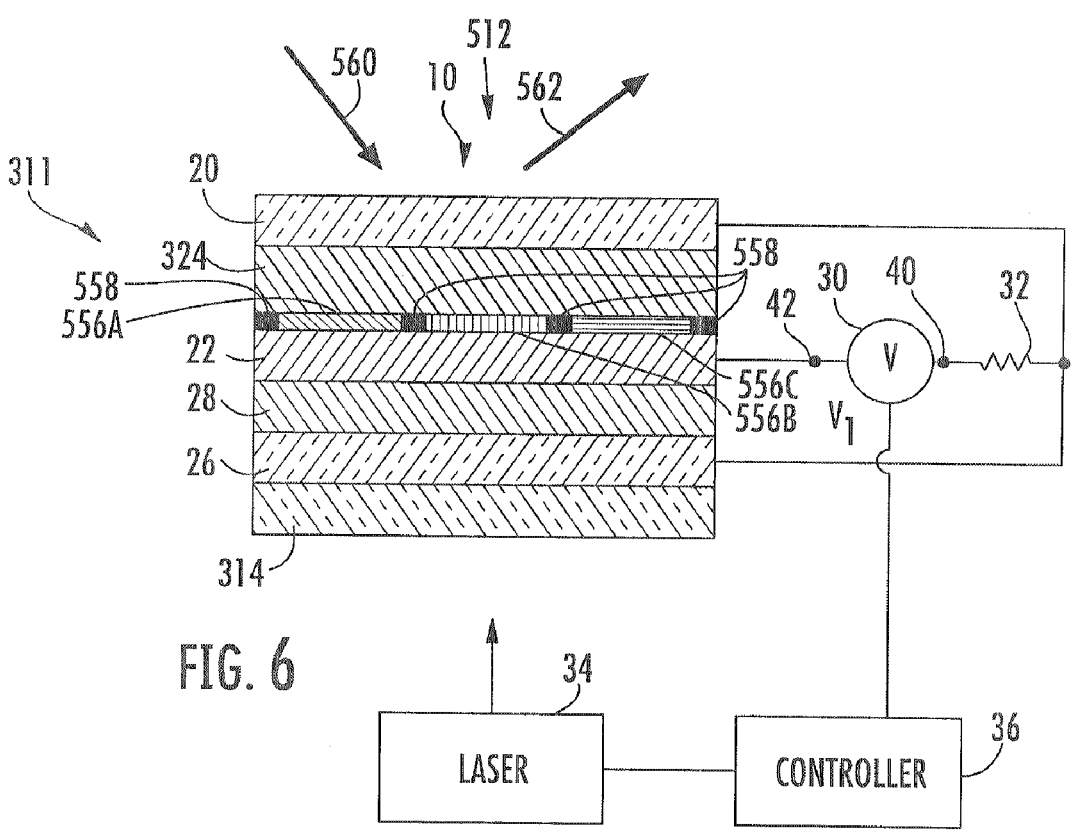
FIG. 6 is a sectional view of another embodiment of the pixel of the display of FIG. 4 according to an example embodiment.

FIG. 6 schematically illustrates pixel 511 of display 512, another embodiment of pixel 311 of display 312. Display 512 is similar to display 312 except that display 512 includes a two-dimensional array of pixels 511, wherein each pixel 511 includes colored reflective portions 556A, 556B, 556C (collectively referred to as elements 556) and light absorbing portions 558 in lieu of color filter 350. Those remaining elements of display 312 which correspond to elements of display 512 are numbered similarly.

Colored reflective portions 556 constitute layers or coatings upon electrode 22 configured to reflect the particular wavelengths of light while absorbing other wavelength s of light. In the particular example illustrated, colored reflective portion 556A is configured to reflect green light. Colored reflective portion 556B is configured to reflect red light. Colored reflective portion 556C is configured to reflect blue light. Because reflective portion 556 reflect each of the three colors, red, green and blue, appropriate voltages may be applied across portions of layer 324 to vary light attenuation by portions of layer 324 such that pixel 511 may reflect red light, green light, blue light or mixtures thereof. In one particular embodiment, portions 556 are sufficiently thin so as to insubstantially electrically insulate electrode 22 from layer 324. In other embodiments, portions 556 may be formed from electrically conductive material. In particular embodiments, electrode 22 may itself provide portions 556.

Light absorbing portions 558 constitute layers or coatings of material provided between portions 356 and configured to absorb substantially all wavelengths of light. For example, in one embodiment, portions 558 may constitute dark or black coatings or materials. Portions 558 reduce inadvertent mixing of reflected light from portions 556. In other embodiments, portions 558 may be omitted.

Although pixel 511 is illustrated as including portions 556 which are configured to reflect green, red and blue light, respectively, in other embodiments, pixel 511 may include a fewer or greater number of such color reflective portions. In other embodiments, portions 556 may be configured to reflect other colors of light. In still other embodiments, pixel 511 may alternatively include a single color reflective layer that reflects a single color of light. Although portions 556 and portion 558 are illustrated as being formed upon electrode 22 adjacent to layer 324, portions 556 and 558 may alternatively be formed on an opposite side of electrode 22 or within electrode 22.

In operation, controller 36 generates control signals causing laser 34 to selectively irradiate portions of layer 28 opposite to one or more of portions 556. Those portions of layer 324 opposite to portions of layer 28 that are in a high resistance state attenuate light less than those portions of layer 324 opposite to portions of layer 28 in a low resistance state. As a result, incident light 560 which has passed through electrode 10 is attenuated by some portions of layer 324 and permitted to pass through other portions of layer 324 to be reflected off of one or more of color reflective portions 556 and to be emitted as light 562 having a desired wavelength. For example, for light 562 to be in the red portion of the visible spectrum, controller 36 generates control signals causing laser 34 to irradiate portions of layer 28 opposite to portion 556 with an appropriate pulse such that portions of layer 28 opposite to portion 556 have a high resistance state. As a result, portions of layer 324 opposite to portion 556B attenuate light to a lesser degree as compared to those portions of layer 324 opposite to portions 556A and 556C. Incident light 560 passes through those portions of layer 324 opposite portion 556B, some of the light is absorbed by portion 556B, red light is reflected from portion 556B, and is emitted as red light 562. The incident light impinging portions of layer 324 opposite to portions 556A and 556B is attenuated to a greater extent. In a similar fashion, pixel 511 may also be actuated with laser 34 to emit green light, blue light or mixtures of two or more of green light, red light and blue light.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a resistive phase change material configured to change resistivity; and
   a charge responsive optical material configured to attenuate light based at least in part upon the resistivity of the phase change material, wherein the phase change material changes between a first resistive state and a second resistive state in response to applied energy, wherein the phase change material, once in the first resistive state, substantially stays in the first resistive state in absence of applied energy and wherein the phase change material, once in the second resistive state, substantially stays in the second resistive state in absence of applied energy.

2. The apparatus of claim 1, wherein the phase change material is configured to change the resistivity in response to being irradiated by a laser.

3. The apparatus of claim 1, wherein the phase change material is configured to have a first resistance upon being irradiated with a first laser pulse having a first duration and a first intensity and wherein the phase change material is configured to have a second greater resistance upon being irradiated with a second laser pulse having a second duration less than the first duration and a second intensity greater than the first intensity.

4. The apparatus of claim 3, wherein the first resistance and the second resistance differ by at least about two order of magnitudes.

5. The apparatus of claim 3, wherein the first duration is less than or equal to about 2 milliseconds.

6. The apparatus of claim 3, wherein the second intensity is less than or equal to about 10 milliwatts.

7. The apparatus of claim 3, wherein the second resistance is at least 100 times the first resistance.

8. The apparatus of claim 3, wherein the charge responsive optical material attenuates light to a first degree when the phase change material has the first resistance and attenuates light to a second lesser degree when the phase change material has the second resistance.

9. The apparatus of claim 1 further comprising a color filter opposite the charge responsive optical material.

10. The apparatus of claim 1 further comprising a red light filter, a green light filter and a blue light filter opposite the charge responsive optical material.

11. The apparatus of claim 10, wherein the charge responsive optical material continuously extends across the red light filter, the green light filter and the blue light filter.

12. The apparatus of claim 10, wherein the charge responsive optical material includes segregated portions opposite each of the red light filter, the green light filter and the blue light filter.

13. The apparatus of claim 1 further comprising a reflective layer opposite the charge responsive optical material.

14. The apparatus of claim 13, wherein the reflective layer includes a red light reflective portion, a green light reflective portion and a blue light reflective portion.

15. The apparatus of claim 1 further comprising:
    a power source having a first terminal and a second terminal;
    a first electrode electrically connected to the first terminal;
    a second electrode electrically connected to the second terminal;
    a third electrode electrically connected to the first electrode, wherein the charge responsive optical material is between the first electrode and the third electrode and wherein the phase change material is between the second electrode and the third electrode.

16. The apparatus of claim 15, wherein the second electrode is reflective.

17. The apparatus of claim 1, wherein the phase change material is selected from a group of materials consisting of:
    Group 4 semiconductors and Ill-V and Ill-VI compound semiconductors.

18. The apparatus of claim 1, wherein the charge responsive optical material is selected from a group of materials consisting of polymer dispersed liquid crystal, LC and OLED materials.

19. The apparatus of claim 1, wherein portions of phase change material having a diameter of less than about 0.5 micron facing the charge responsive optical material are configured to have distinct reflectivities.

20. The apparatus of claim 1 further comprising a laser configured to irradiate the phase change material to selectively change the resistivity of the phase change material.

21. A voltage modulator comprising:
    a power source having a first terminal and a second terminal;
    a first electrode electrically connected to the first terminal;
    a second electrode electrically connected to the second terminal;
    a third electrode electrically connected to the first electrode; and
    a resistive phase change material between the second electrode and the third electrode.

22. The voltage modulator of claim 21 further comprising a charge responsive optical material between the first electrode the third electrode.

23. A method comprising:
    changing a resistivity of a resistance phase change material to vary light attenuation by a charge responsive optical material, wherein changing the resistivity comprises:
    irradiating a portion of the phase change material with a first laser pulse having a first intensity for a first duration such that the portion has a first resistance; and
    irradiating the portion of the phase change material with a second laser pulse having a second intensity greater than the first intensity for a second duration less than the first duration such that the portion has a second greater resistance.

24. The method of claim 23 further comprising filtering wavelengths of light that have passed through the charge responsive optical material.

25. The method of claim 23 further comprising selectively irradiating portions of the phase change material with a laser.

26. The method of claim 23 further comprising increasing a resistance of the phase change material to decrease light attenuation by the charge responsive optical material.

27. The method of claim 23 further comprising annealing a portion of the phase change material with the first laser pulse such that the portion has the first resistance.

28. An apparatus comprising:
    a resistive phase change material configured to change resistivity; and
    a charge responsive optical material configured to attenuate light based at least in part upon the resistivity of the phase change material, wherein the phase change material is configured to have a first resistance upon being irradiated with a first laser pulse having a first duration and a first intensity and wherein the phase change material is configured to have a second greater resistance upon being irradiated with a second laser pulse having a second duration less than the first duration and a second intensity greater than the first intensity.

* * * * *

UNITED STATES PATENT AND TRADEMARK OFFICE
CERTIFICATE OF CORRECTION

PATENT NO. : 7,382,512 B2
APPLICATION NO. : 11/259609
DATED : June 3, 2008
INVENTOR(S) : Zhizhang Chen et al.

It is certified that error appears in the above-identified patent and that said Letters Patent is hereby corrected as shown below:

On the title page, item (54), in column 1, in "Title", line 1, delete "RESISTIVITY" and insert -- RESISTIVE --, therefor.

In column 1, line 1, delete "RESISTIVITY" and insert -- RESISTIVE --, therefor.

In column 2, line 43, after "as" delete "II-V" and insert -- III-V --, therefor.

In column 6, line 53, delete "trausmissivity" and insert -- transmissivity --, therefor.

In column 10, line 3, in Claim 17, delete "111-V and 111-VI" and insert -- III-V and III-VI --, therefor.

In column 10, line 28, in Claim 22, insert -- and -- before "the third".

Signed and Sealed this

Twelfth Day of January, 2010

David J. Kappos
*Director of the United States Patent and Trademark Office*